United States Patent [19]

Adams et al.

[11] Patent Number: 4,784,163

[45] Date of Patent: Nov. 15, 1988

[54] PROCESS FOR PRODUCING SMOKING ROD WRAPPER AND SMOKING ROD CONTAINING SAME

[75] Inventors: Brian Adams, Newtown Abbey; Linda Cunningham, Armagh; Shane C. Browning, Antrim, all of Northern Ireland

[73] Assignee: Gallaher Limited, England

[21] Appl. No.: 23,987

[22] Filed: Mar. 10, 1987

Related U.S. Application Data

[63] Continuation of Ser. No. 834,235, Feb. 26, 1986.

[30] Foreign Application Priority Data

Feb. 28, 1985 [GB] United Kingdom .................. 8505173
Jan. 7, 1986 [GB] United Kingdom .................. 8600258

[51] Int. Cl.$^4$ ............................ A24C 5/60; B41M 3/00
[52] U.S. Cl. ..................................... 131/284; 101/170; 101/426
[58] Field of Search ................ 131/284; 101/426, 120, 101/129

[56] References Cited

U.S. PATENT DOCUMENTS

| | | | |
|---|---|---|---|
| 2,012,149 | 8/1935 | Wheeler | 131/284 |
| 2,366,187 | 1/1945 | Friedwald | 131/284 |
| 3,378,015 | 4/1968 | Heipmann | 131/284 |
| 4,236,532 | 12/1980 | Schweizer et al. | 131/335 |
| 4,619,278 | 10/1986 | Smeed | 131/284 |

FOREIGN PATENT DOCUMENTS 0103969 3/1984 European Pat. Off. .
2027326 2/1980 United Kingdom .

Primary Examiner—Clyde I. Coughenour
Attorney, Agent, or Firm—Andrus, Sceales, Starke & Sawall

[57] ABSTRACT

A printing ink comprises a liquid vehicle, containing a binder, and a smoke-enhancing additive in the form of particles that are insoluble in the liquid vehicle and that have sizes in the range 5–80 microns, preferably at least 90% of the particles having sizes in the range 10–50 microns. The inks are printed onto the inner surface of a smoking rod wrapper in amounts such that the weight of dry deposits is in the range 20 to 60 mg per wrapper.

9 Claims, No Drawings

PROCESS FOR PRODUCING SMOKING ROD WRAPPER AND SMOKING ROD CONTAINING SAME

The present application is a continuation application of U.S. patent application Ser. No. 06/834,235, filed Feb. 26, 1986 and now abandoned.

The present invention relates to printing inks, especially suitable for printing the inner surface of a cigarette wrapper, to wrappers carrying dried deposits of the ink and smoking rods made with the wrappers.

In GB No. 2027326 a web of reconstituted tobacco sheet is printed with a non-aqueous ink containing ground tobacco offal to produce markings simulating the veins of natural tobacco leaf. The printed web is used as a cigar wrapper in place of natural tobacco leaf. One side of the sheet is printed and the printed side forms the outer surface of the cigar. The sheet is 100-500 micron thick and likely to be non-porous. The amount of tobacco offal printed onto the sheet is not mentioned but is likely to be small relative to the total amount of tobacco constituting the sheet by virtue of the nature of the pattern that is being printed and would thus have no effect on the smoking proporties of a cigar made with the wrappers. The inks have a low tobacco content (14% for the gravure ink exemplified and 30% for the screen printing ink exemplified) so that even if it were desired to produce high loadings of ink onto the web a large amount of solvent would have to be dried off the printed web and this is clearly undesirable. The tobacco is ground to 200 mesh (about 75 microns, according to the French equivalent of this citation, FR No. 2431834) which will produce an ink that is satisfactory for producing a coarse raised pattern on the printed substrate, as is desired in the application disclosed. Additives other than ground tobacco and conventional ink additives are not mentioned.

The inks disclosed in GB No. 2027326 would be of no use in printing wrappers for cigarettes, which are usually made from porous white paper having a thickness of about 40 micron where a reasonably high loading of ink additive was required, since the dried deposits would be too coarse for instance two or more times the thickness of the paper web, thus decreasing the length of printed paper that may be wound on to a roll in the production of wrappers. This increases the number of times the printed roll needs to be changed and thus decreases the manufacturing rate. Also the amount of solvent applied to the web would be undesirably high. Evaporating and recovering large amounts of solvent increases the manufacturing time and energy.

We described in, for instance, British Patent Specifications Nos. 2007078 and No. 2094611 how wrappers for smoking rods could be printed with an ink containing a smoke enhancing additive, that is to say an additive which will in use, upon approach of the hot burning tip of the smoking rod, be transferred and contribute to the main stream smoke drawn through the rod to enhance the satisfaction to the smoker. The described inks were aqueous inks and, in practice, contained the additive in solution. For instance in an example the ink is an aqueous solution of nicotine hydrogen tartrate thickened by carboxymethyl cellulose. Although there was reference to the inks also containing organic solvent, e.g. ethyl alcohol or isopropyl alcohol, it appears that the inks would always have also contained water as part of the carrier.

The maximum amount of additive that could be incorporated in the ink was relatively low, for instance 20% or less, because of the need to dissolve the additive in a fluid vehicle. High loadings of additive on the substrate therefore required the application of large amounts of ink and this was often detrimental to the appearance or other properties of the substrate. For instance, even quite low amounts of ink tended to be visible through the substrate and so spoilt the appearance of the smoking rod. This was a particular problem when the additive was a nicotine salt, such as nicotine hydrogen tartrate. Another problem was that the printed deposits of dissolved additive tended to be tacky.

These problems of relatively low loadings and spoiling the substrate can be reduced, but not eliminated, by formulating an ink from a solution of a water soluble salt formed between a polymeric acid, such as a polysaccharide, and nicotine or other suitable alkaloid, the salt serving as binder and viscosity regulator as disclosed in EP No. 0103969. However inks based on these polymeric salts still tend to suffer from tackiness and the other disadvantages and, additionally, suffer from the disadvantage that it can be difficult to produce the salts, and inks containing them, conveniently on a commercial scale. Also they are only of value for printing an alkaloid, and in the invention we are concerned with printing a wide range of different additives.

It would be desirable to be able to formulate inks easily from readily available materials and that have high additive loadings and that can be applied in large quantities onto a substrate without detrimentally affecting the other properties of the substrate.

It is known to formulate decorative inks containing particulate pigment dispersed in a liquid vehicle. The particulate material always has very small particle size, typically 0.2 to 1 micron, and the amounts of these particles in the inks are always very low since if the amounts are increased significantly the ink becomes a stiff paste that cannot conveniently be printed.

A printing ink according to the invention comprises a liquid vehicle, which comprises an ink binder, and a smoke-enhancing additive and is characterised in that the smoke-enhancing additive is present in the ink in the form of particles that are insoluble in the liquid vehicle and that substantially all have sizes in the range 5-80 microns. Preferably at least 90% of the particles have sizes in the range 10-50 microns, preferably 95% of the particles or more having sizes in the range 10-50 microns.

As a result of incorporating the additive in the form of particles in this size range, it is possible to increase the amount of additive in the ink considerably compared to the amount that can be incorporated if the additive is in solution, in conventional sub-micron size particles or as particles of ground tobacco as in the inks disclosed in GB No. 2027326. Thus the inks preferably contain at least 33% by weight, based on total ink, of the smoke-enhancing additive. The amount of the additive is usually less than 70% and is most preferably in the range 33-55%.

According to a second aspect of the invention a process for enhancing the smoking properties of a smoking rod comprises providing the inner surface of the smoking rod wrapper with dried deposits comprising binder and an effective amount of a smoke-enhancing additive, and is characterised in that each deposit comprises an impregnated part, that is impregnated into the inner surface of the wrapper, and a raised part that is raised above the surface of the wrapper, the smoke-enhancing additive being present substantially only the raised part. The deposits are generally printed deposits and are usually provided by printing an ink according to the invention.

According to a third aspect of the invention, in a process for producing a smoking rod wrapper, a web which is less than 100 microns thick is printed on one surface with an ink according to the invention. The web is generally substantially white in colour.

As a result of the additive being insoluble in the liquid vehicle the appearance of the unprinted surface of the substrate can be substantially unchanged even at high additive loadings, whereas in the prior art processes, where this type of wrapper was printed, strike through of the additive even at low additive loadings tended to spoil the appearance of the unprinted surface of the smoking rod wrapper. The particles of smoke enhancing additive must be sufficiently large that the ink has appropriate rheology despite the high content of smoke enhancing additive and therefore substantially all the particles are at least 5 microns in size and most preferably at least 10 microns in size. (All references to the size of the particles refer to the maximum dimension of the particles.) However smaller particles may be present in small amounts, e.g. less than 10% preferably less than 5% by weight based on the total weight of particles, provided they do not soak into the substrate sufficiently to spoil its appearance. Preferably there is substantially no strike through of ink through the substrate. If the particles are too large it is difficult to form appropriate deposits of them, for instance by printing or for an adequate loading to be achieved and so the particles should substantially all be less than 80 microns in size.

The substrate web should be sufficiently permeable to allow some impregnation of the ink into the substrate, but insufficiently permeable to allow particles to strike through the substrate web. Smoking rod wrappers are formed from paper that is usually less than 100 microns generally 30–50 microns thick and that is porous, often having pores with sizes in the range of about 1 micron. In a smoking rod the deposits are provided on the inner surface only of the wrapper, the outer surface preferably remaining substantially unchanged in appearance.

The volatilisable smoke enhancing additive may be any additive which will volatalise in use, (upon approach of the hot burning tip of the smoking rod), and will be transferred to and will contribute to the main stream drawn through the rod to enhance the satisfaction to the smoker.

One type of suitable additive is a compound to improve initial impact, e.g. biuret, nicotine, ammonium compounds such as ammonium carbonate, carbamate, sulphate and phosphate, and quaternary compounds and urea. Another type is a flavour improver such as menthol borate, tobacco extracts and synthetic flavourants. Another type is a material to reduce irritancy (harshness reducers) such as glycols and other hydrophilic smoke diluents, sugars and organic acids such as citric acid. Another type is a burn controllers such as sodium carboxymethyl cellulose. Others are smoke producing agents and smoke nucleation agents. Physiologically active compounds such as alkaloids generally nicotine, may be used.

The additive may, if crystalline, be provided as crystals of the desired particle size. However if necessary smaller particles may be aggregated to form particles of the desired size.

The invention is particularly useful when the additive comprises particles which comprise ethanol-insoluble components of tobacco and ethanol-soluble components of tobacco, nicotine being present in an amount of 1–50% by weight based on the weight of total tobacco components in the ink. The ethanol-soluble components are the components of tobacco that are extractable with aqueous ethanol and the ethanol-insoluble components are the components that remain after the extraction.

Extraction of ethanol-soluble components is a standard process and may be conducted using solvents other than aqueous ethanol, in which the ethanol-soluble components are also soluble, for instance aqueous methanol, or ethyl acetate. If the ethanol-soluble components are extracted from tobacco before use in the invention they may be chemically reacted, for instance to convert nicotine to a nicotine salt, before being mixed with the ethanol-insolubles, or they may be used unreacted. If the ethanol-soluble components are extracted from the ethanol-insolubles, for use in the invention, they may be recombined with insolubles different from those from which they were extracted. For instance extracted ethanol-solubles from leaf tobacco may be recombined with, for instance, stem tobacco, or with extracted leaf or stem tobacco.

Generally however the ethanol-soluble components, if extracted, are recombined with ethanol-insolubles from which they were extracted. Thus leaf or other tobacco may be extracted to remove ethanol-solubles, some of the ethanol-insolubles may then be discharged, and the ethanol-solubles recombined with the remaining ethanol-insolubles to form a product having a higher ethanol-solubles content, and therefore a higher nicotine content, than the starting tobacco.

Preferably however the particles are formed by comminution of unextracted tobacco leaf, preferably having a nicotine content of 5 to 12%, generally 6 to 8 or 10% by weight based on the weight of leaf. However by conducting the extraction process it is possible for the nicotine content of the particles to be much higher, often up to 15 or 20% by weight and even up to 50% by weight of the combined weight of ethanol-soluble and ethanol-insoluble tobacco components.

Some components of tobacco may tend to cause undesired staining of the wrapper on which they are printed. This can be eliminated by extracting nicotine from tobacco leaf, washing the resultant pulp thoroughly to remove colour, or bleaching it chemically, (e.g., with hydrogen peroxide), and then recombining the nicotine with the pulp.

These particles can be obtained by comminution of the ethanol-insoluble components of tobacco intimately admixed with the soluble components. For instance the communication can be in an energy mill, causing dry abrasion of the particles, in a dry colloid mill or in a colloid or bead mill that causes slurry grinding. One preferred method of comminution involves slurry grinding in an organic solvent at a temperature below 0° C. For instance the mixture of ethanol-insoluble and ethanol-soluble components, which may be tobacco dust, offal, stem or leaf as well as a blend of extracted ingredients, may be fed into a ball mill containing ethanol as organic solvent and held at a temperature between −10° C. and −30° C. during grinding.

The liquid vehicle of the ink normally comprises a carrier and a binder and the smoke enhancing additive must be substantially insoluble in both. Its solubility in the vehicle, and also in the carrier, is preferably less than 10, most preferably less than 6, grams per 100 grams of the vehicle or carrier. Thus there may be a small amount of additive dissolved in the liquid phase of the ink. This may be, for instance, ethanol-soluble components of tobacco that are also soluble in the ink liquid vehicle. The smoke enhancing additives are often soluble in water and so the carrier, and the entire vehicle, are preferably non-aqueous. The carrier should be sufficiently volatile that deposits of the ink can easily be dried and so should have a boiling point generally below 100° C. Suitable carriers are organic liquids such as aliphatic alcohols, ketones, esters and hydrocarbons and mixtures of these. Ethanol and ethylacetate and mixtures are the preferred carrier.

The carrier must include binder and, if necessary, other additives to control the rheology of the ink to make it suitable for the chosen method of application. The binder may be a synthetic polymer that may be curable after application of the ink but preferably is a cellulosic material that can dry to bond the particles together in the dry deposits.

The binder must be soluble in the chosen solvent. It may be a natural, modified natural or synthetic polymer. For instance it may be a cellulosic binder such as carboxymethyl, methyl, hydroxypropyl or hydroxethyl cellulose, a gum such as an alginate or pectinate or a synthetic polymer such as EVA or PVA.

The use of ethyl cellulose as binder, together with ethanol or other organic liquid in which it is soluble, is particularly preferred as deposits containing it as the sole binder are less tacky, less likely to transfer onto the opposite face of a rolled printed web and less likely to lose their shape, than deposits containing other binders, when the atmosphere is humid.

The liquid vehicle preferably consists solely of the carrier (generally ethanol) and binder (generally ethyl cellulose) but may include other additives to control the rheology or other properties of the ink, for instance as discussed in British Patent Specifications Nos. 2007078 and 2094611. The amount of binder is generally 2 to 20%, preferably 5 to 15%, by weight of the ink or 5 to 40% preferably 10 to 25% by weight of the liquid phase of the ink.

The particles may be formed outside the liquid vehicle of the ink and then combined with the liquid vehicle or, preferably, are comminuted, e.g. by grinding in a mill, to the desired size in the liquid vehicle.

The inks are preferably printed onto the smoking rod wrapper web by known processes, for example rotary screen printing or, preferably gravure printing. The particle size range of the additives in the inks enable screens or gravure cylinders having small holes or shallow cells, respectively, to be used. Thus the gravure cells may have a depth of less than 100 microns, for example less than 80 microns. Particles larger than the desired size range would not be able to enter the cells. It is preferred to use gravure plates having shallow cells to maximise the proportion of ink released from the cells on to the substrate. Using deep cells, a substantial amount of ink remains in the bottom of the cells after printing. The particle size range also enables the inks to have the required viscosity at the high levels of additive, so that high loadings of additive onto the smoking rod wrapper may be achieved without an unsatisfactorily large amount of solvent being applied, and thus having to be dried.

The frequency and size of the deposits can be chosen according to the desired loading of the additive. For instance, if the additive comprises nicotine, generally the density is such that the amount of nicotine printed on to a conventional smoking rod wrapper from 50 to 75 mm long is from 1 to 2, preferably about 1.6, mg. For other additives the loading may be higher or lower. For instance citric acid (harshness reducer) may be present at an average amount of about 4.0 mg/cm$^2$, glycerol (smoke producer/harshness reducer) may be present at an average amount of about 2.8 mg/cm$^2$ and urea may be present in an average amount of about 0.7 mg/cm$^2$. Preferably substantially all of the additive is printed on the half of the wrapper distant from the filter or mouth end of the smoking rod. For instance the distribution may be approximately as shown in FIG. 3 of GB No. 2,094,611. The total weight of printed deposits for each smoking rod wrapper is generally in the range 20 to 60, preferably 25 to 50 mg dry weight. The concentration of additive on the wrapper is usually in the range 0.1–5.0 mg/cm$^2$, preferably about 0.2 to 4.0 mg/cm$^2$. Each deposit preferably has a dry height of 20 to 150, generally 30 to 50 microns and a wet height (before evaporating the liquid carrier) of 40 to 250, preferably 60 to 100, microns. Each printed deposit is generally circular or square and may have a maximum transverse dimension typically of 0.25 to 3, generally 0.5 to 1.5 mm.

The following examples illustrate the invention.

EXAMPLE 1

15 kg of tobacco containing 6% nicotine by weight was added to 33.5 kg of ethanol and cooled to −25° C. by addition of solid carbon dioxide.

The mixture was then ground to a particle size of less than 50 microns using a colloid mill. A low viscosity grade ethyl cellulose binder (3 kg) was then added to the slurry and left to gell.

The ink had a typical viscosity of 15–20 poise at 20° C.

The ink was applied wrapper by deep cell gravure printing to give a solids loading of 32 mg/cm$^2$ over an area of 8cm$^2$. The nicotine loading per cigarette wrapper was 1.6 mg.

EXAMPLE 2

10 kg of urea was suspended in 15.9 kg of ethanol and ground in a colloid mill to give a suspension with the majority of crystals in size range 20–80 μm. The grind was transferred to a mixing tank and 1.5 kg of ECN50 ethylcellulose added. The mixture was stirred till gelling of the ethyl cellulose was complete. The ink was suitable for gravure printing and had a viscosity of 20 poise at 20° C. and a content of about 36% by weight urea.

The ink was printed by gravure onto cigarette paper wrapper at a wet loading of 1.80 mg/cm$^2$ as deposits each substantially 1 mm in diameter. The loading of urea was 0.67 mg/cm$^2$.

After drying by convection each dot was observed to consist of a portion soaked into the surface of the paper and consisting substantially only of ethyl cellulose and a raised portion consisting of particles of the additive bonded with ethyl cellulose. Despite the high additive and wet loadings the reverse side of the cigarette wrapper was unchanged in appearance. The dots were non-tacky and had no tendency to transfer to other sheets.

Similar satisfactory results were obtained when the urea was replaced by nicotine dihydrogen tartrate or by dinicotine tritartrate.

EXAMPLE 3

1 kg of ethyl stearate (smoke producer) was suspended in 2 litres of ethanol and the slurry ground in a water cooled ball mill to give a suspension with the majority of crystals in the size range 15–50 microns. The grind was transferred to a mixing tank and 200 g of low viscosity hydroxypropyl cellulose added. The mixture was stirred till a constant viscosity (35 poise) was attained.

The ink was rotary screen printed onto cigarette paper at a wet loading of 7.2 mg cm$^{-2}$. The dry solids loading on the printed wrapper was 2.4 mg cm$^{-2}$.

EXAMPLE 4

1 kg of menthol borate (flavour) was suspended in 2 litres of ethyl acetate and the slurry ground in a colloid mill to give a suspension with the majority of particles in the size range 20–80 microns. The ethyl cellulose 200 g (grade ECN 7) supplied by Hercules was added to the suspension and mixture left till the ethyl cellulose had completely gelled. The ink was suitable for gravure printing and had a viscosity of 5 poise at 20° C. Printed ink had a menthol content of 75% by weight of dry solids on the wrapper.

EXAMPLE 5

5 kg of citric acid monohydrate (harshness reducer) was suspended 7.5 kg of ethyl acetate and ground in a colloid mill until the majority of crystalline particles lay in the size range 20–80 microns.

0.5 kg of ethyl cellulose (Hercules grade ECN 100) was added to the slurry which was stirred till the cellulose had completely gelled, the printing composition had a viscosity of 45 poise at 20° C.

The ink was gravure printed onto cigarette paper in a manner such that the maximum concentration of acid was at the tipped end of the cigarette wrapper. The wrapper had a citric acid loading of 4.0 mg cm$^{-2}$.

EXAMPLE 6

5.0 kg of glycerol (harshness reducer/smoke producer) were added to 2.5 kg of absorbent silica in 7.5 kg of ethyl acetate. The slurry was mixed till disaggregation of the silica was complete, particles having a size greater than 20 microns were not observed. 1.0 kg of a low viscosity grade hydroxypropyl cellulose (Klucel EF, Hercules) was added to the slurry which was stirred until a constant viscosity (80 poise) was attained.

The ink was rotary screen printed onto cigarette wrapper to give a solids loading of 4.8 mg cm$^{-2}$, the glycerol loading was shown by analysis to be 2.8 mg cm$^{-2}$.

We claim:

1. A process for providing a smoking rod wrapper having an increased loading of a smoke enhancing additive while avoiding bleed-through in the wrapper, said method comprising the steps of:

providing a white, smoking rod wrapper material, said material being less than 100 microns thick;

providing a non-aqueous, liquid vehicle having a binder, the vehicle containing particles of a water soluble smoke enhancing additive for forming an ink, the particles being insoluble in the liquid vehicle and substantially all the particles having sizes in a range of 5–80 microns, the smokeenhancing additive being present in an amount in a range of 33–70% by weight of the ink, the smoke enhancing additive being selected from a class consisting of biuret, ammonium compounds, urea, menthol borate, tobacco components, tobacco extracts, synthetic flavorants, glycols, hydrophylic smoke dilutants, sugars, organic acids, sodium carboxymethyl cellulose, alkaloids, glycerol, and ethyl stearate;

printing one side of the smoking rod wrapper material with said ink to provide an effective smoke-enhancing amount of the additive on the wrapper material; and drying said ink on the material to form a deposit having an impregnated ink part that is impregnated into the surface of the wrapper material and a raised part that is raised above the surface of the wrapper material, the smoke-enhancing additive being present substantially only in the raised part.

2. A process according to claim 1 wherein the printing step is further defined as carried out such that a smoking rod produced with the printed smoking rod wrapper has a total loading of 20 to 60 mg additive per rod, dry weight.

3. A process according to claim 1 wherein the printing step is further defined as carried out such that, in a smoking rod produced with the printed smoking rod wrapper, the additive is printed in a profiled manner with an increased amount of the additive toward the burning end of the smoking rod.

4. A process according to claim 1 wherein the step of providing a vehicle containing an additive is further defined as one in which at least 90% by weight of the particles have sizes in the range 10 to 50 microns.

5. A process according to claim 1 wherein the step of providing a vehicle containing an additive is further defined as one in which at least 95% by weight of the particles have sizes in the range 10 to 50 microns.

6. A process according to claim 1 wherein the step of providing a vehicle containing an additive is further defined as one in which the smoke-enhancing additive is present in the ink in an amount in the range of 33–55% by weight.

7. A process according to claim 1 wherein the step of providing a vehicle containing an additive is further defined in that the additive comprises nicotine tartrate.

8. A process according to claim 1 wherein the step of providing a vehicle containing an additive is further defined in that the additive comprises ethanol-insoluble components of tobacco and ethanol-soluble components of tobacco, nicotine being present in the additive in an amount of 1–50% by weight based on the total weight of tobacco components.

9. A smoking rod having a central core of tobacco surrounded by a smoking rod wrapper comprising the product of the process according to claim 1.

* * * * *